(12) United States Patent
Raja et al.

(10) Patent No.: US 9,245,247 B2
(45) Date of Patent: Jan. 26, 2016

(54) QUEUE ANALYSIS

(71) Applicant: Vision Semantics Limited, London (GB)

(72) Inventors: Yogesh Raja, London (GB); Shaogang Gong, Middlesex (GB)

(73) Assignee: Vision Semantics Limited, London (GB)

( * ) Notice: Subject to any disclaimer, the term of this patent is extended or adjusted under 35 U.S.C. 154(b) by 3 days.

(21) Appl. No.: 14/247,412

(22) Filed: Apr. 8, 2014

(65) Prior Publication Data

US 2014/0301602 A1 Oct. 9, 2014

(30) Foreign Application Priority Data

Apr. 8, 2013 (GB) .................................... 1306313.6

(51) Int. Cl.
*G06K 9/00* (2006.01)
*G06Q 10/06* (2012.01)

(52) U.S. Cl.
CPC .. *G06Q 10/0631* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 5,581,625 A | 12/1996 | Connell | |
| 8,010,402 B1 * | 8/2011 | Sharma et al. | 705/7.29 |
| 8,107,676 B2 * | 1/2012 | Senior | 382/103 |
| 8,224,028 B1 | 7/2012 | Golan et al. | |
| 2007/0253595 A1 * | 11/2007 | Sorensen | 382/103 |
| 2011/0231419 A1 * | 9/2011 | Papke et al. | 707/756 |
| 2012/0207350 A1 * | 8/2012 | Loos et al. | 382/103 |
| 2013/0070974 A1 * | 3/2013 | Stefani | 382/118 |
| 2014/0267738 A1 * | 9/2014 | Allen et al. | 348/156 |

FOREIGN PATENT DOCUMENTS

EP 0823821 A2 2/1998

OTHER PUBLICATIONS

Aubert, Didier; "Passengers Queue Length Measurement": INRETS: France, 1999.
May 22, 2014—(EP) Extended Search Report—App 1416767.8.
Aug. 19, 2015—(EP) Examination Report—App 14163767.8.
Sep. 26, 2013 Search Report issued in British Patent Application No. 1306313.6.

* cited by examiner

*Primary Examiner* — Shervin Nakhjavan
(74) *Attorney, Agent, or Firm* — Banner & Witcoff, Ltd.

(57) ABSTRACT

A method and system for analyzing a queue comprising: obtaining a first image acquired at a first time of a first position within a queue; obtaining a second image acquired at a second time of a second position within the queue; detecting a queue member within the first image; detecting a queue member with the second image; determining that the queue member detected within the second image is the same as the queue member detected within the first image; and determining a trajectory of the queue member within the queue based on a difference between the first time and the second time.

20 Claims, 3 Drawing Sheets

Fig. 2
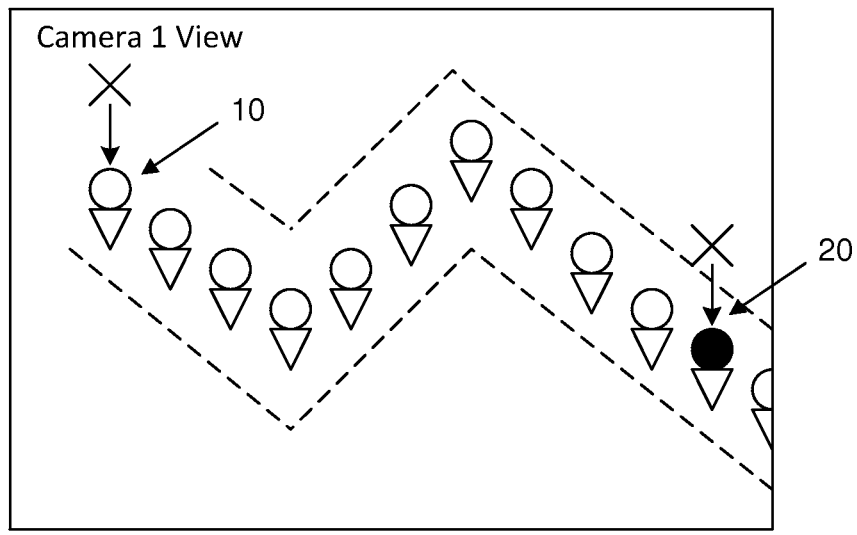
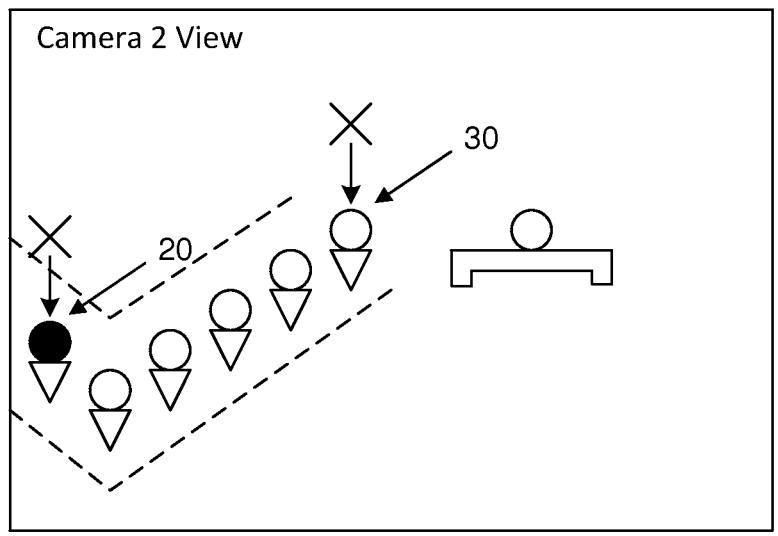
Fig. 3

QUEUE ANALYSIS

CROSS REFERENCE TO RELATED CASES

This application claims priority to United Kingdom Application No. 1306313.6, filed Apr. 8, 2013, to Raja et al., hereby incorporated by reference in its entirety for all purposes.

FIELD OF THE INVENTION

The present invention relates to a system and method for analysing queues and in particular for determining queue properties from image and video data.

BACKGROUND OF THE INVENTION

Many organisations dealing with the public are required to manage the length of time people are required to queue for services, for example customers in a bank or passengers going through security checks at an airport. In order to conduct such queue management more effectively, they require statistical estimates of queuing times experienced by people within different time slots throughout the day, so as to optimise their operations and minimise queuing times accordingly.

Currently, techniques employed for monitoring queue lengths and estimating queuing times in airports involve a combination of laser-based passenger counting systems (which cannot track specific individuals) and Bluetooth signal-tracking (which requires passengers to have an active Bluetooth device about their person). Such systems cannot be installed in all areas and are highly inaccurate. Most visual sensor based systems require the ability to accurately track all individuals in a queue in order to derive useful statistics, an unreasonable and unworkable assumption in even modest real-world scenarios where imaging conditions and crowd behaviour is relatively unrestricted.

Therefore, there is required a system and method that overcomes these problems.

SUMMARY OF THE INVENTION

Queue members (in particular but not limited to people) move on a trajectory through a queue usually by new queue members joining the queue and the longest queuing members leaving the queue at the front when the purpose of the queue is fulfilled for them.

Images are obtained or acquired from two or more positions within the queue. These may be still or moving images. As individual queue members move on their trajectory through the queue then they will be imaged at different times and appear in different images (different positions). The images are analysed and one or more individual queue members are identified in the images. When the same individual is identified in different images at different times then an inference may be made as to their movement and trajectory through the queue.

In general, each queue member will have substantially the same trajectory (although the queue may move faster or slower at different times). Therefore, determining the trajectory of one particular queue member provides an approximation of the progress or progression of the queue for a particular time period. Therefore, information about the queue, such as the total queuing time or the time taken to pass from one point in the queue to another, may be determined. Following different queue members through the queue may provide additional information and queuing statistics, such as the queue time at a particular time of day, for example.

Improved queue time estimation or inference may be achieved by randomly, pseudo randomly or otherwise sampling two or more queue members (preferably visually stable queue members) to detect and track in order to yield a combined queue time estimation. Therefore, not all queue members need be detected and tracked (they may not all be visually distinct or stable due to occlusion and/or none distinctive clothing).

In accordance with a first aspect there is provided a method of analysing a queue comprising the steps of:
(a) obtaining a first image acquired at a first time of a first position within a queue;
(b) obtaining a second image acquired at a second time of a second position within the queue;
(c) detecting a queue member within the first image;
(d) detecting a queue member with the second image;
(e) determining that the queue member detected within the second image is the same as the queue member detected within the first image; and
(f) determining a trajectory of the queue member within the queue based on a difference between the first time and the second time.

The first and second images may be acquired or captured by the same or different cameras. The queue member may be followed through the queue over time by acquiring additional images at different points in the queue. This may improve the accuracy of the determined trajectory. Determining the trajectory may further comprised considering the movement of a queue member between two points as a tracklet. This may be repeated for different pairs of points so that multiple tracklets may form more complete trajectories within the queue. The queue may be analysed in real-time (i.e. processing the images as they are made) or analysed from images recorded over a period of time and then read back. Additionally, any combination of one or more queue members may be detected and tracked in the queue but not all the queue members in the queue must be tracked.

Optionally, the method may further comprise the steps of obtaining further images of further positions within the queue and detecting the queue member within these further images. Additional images and queue member detections may improve the characterisation of the queue and its progress.

Preferably, the images overlap. In other words, the view of each image overlaps with at least one other image so that each portion of the queue may be monitored and analysed.

Preferably, positions within the queue are selected from the front of the queue, back of the queue, and the middle of the queue. There may be several positions within or at different stages along the queue. The actual or physical positions or locations in the queue may be measured and recorded.

Optionally, pairs or further pairs of images are obtained, used to detect the queue member, and determine their trajectory, wherein each pair of images includes at least one common point in the queue. The pairs of images may overlap or be separated.

Optionally, determining the trajectory may further include the step of forming the trajectory from two or more other trajectories. These other trajectories may be tracklets or partial trajectories within the queue.

Optionally, determining that the queue member detected within the second image is the same as the queue member detected within the first image may be based on similarities of visual appearances of the queue member within each image. Other criteria may be used.

Advantageously, determining a trajectory of the queue member within the queue may further comprise the step of applying the Munkres (also known as the Hungarian) assignment algorithm to the two or more other trajectories and the similarities of the visual appearances of the queue member within each image. Other algorithms may be used.

Preferably, detecting the queue member within an image further comprises selecting a group of pixels containing the queue member. In other words, a procedure may be executed to box or bound the queue member and isolate their image from the rest of the image in order to restrict processing or comparison to that particular portion.

Preferably, the images may be video images. Frames within the video images may be analysed or the analysis may be carried out on groups or moving images. Therefore, movement of individuals may be used as a further identifier of that individual or used in the comparison steps.

Preferably, determining a trajectory of the queue member within the queue may be further based on the queuing distance between the first position and the second position. In other words, as well as the time being taken into consideration in determining movement within the queue of queue members, the actual distance moved (and perhaps the total length of the queue) may also be considered. Distance may be in absolute terms (meters) but also in number of queue members (e.g. 10 people).

Optionally, the method may further comprise the step of determining from the trajectory a total queuing time for the queue member or queue. Other statistics may be determined or collected.

Optionally, the method according may further comprise iterating steps (a) to (f) to determine a plurality of trajectories. This improves accuracy as it facilitates averaging and other statistical techniques. Each of the plurality of trajectories may relate to a different queue member, for example.

Optionally, the method may further comprise determining an average trajectory from the plurality of trajectories.

Optionally, the method may further comprise the step of determining an average queue time from the average trajectory.

Preferably, the trajectory may include data describing how the queue member moves through the queue over time.

According to a second aspect, there is provided a system for analysing a queue comprising a processor configured to:
(a) receive a first image acquired at a first time of a first position within a queue;
(b) receive a second image acquired at a second time of a second position within the queue;
(c) detect a queue member within the first image;
(d) detect a queue member with the second image;
(e) determine that the queue member detected within the second image is the same as the queue member detected within the first image; and
(f) determine a trajectory of the queue member within the queue based on a difference between the first time and the second time.

Preferably, the system may further comprise a first and a second camera arranged to capture the first and second images, respectively. The images may be acquired from different sources including live images, recorded images, multiple cameras and the same camera.

Optionally, the first and second cameras may be arranged to have partially overlapping views of the queue.

Preferably, the system may further comprise a user interface configured to receive a signal indicating the first and the second positions of the queue on the first and second images.

Therefore, the system may receive user input defining points or positions within the queue of interest or to define the extent of the queue.

Optionally, the first or second positions of the queue may be selected from: the start of the queue, one or more intermediate positions in the queue, and the end of the queue.

The methods described above may be implemented as a computer program comprising program instructions to operate a computer. The computer program may be stored on a computer-readable medium or transmitted as a signal.

It should be noted that any feature described above may be used with any particular aspect or embodiment of the invention.

The following numbered clauses provide illustrative examples:

1. A method of analysing a queue comprising the steps of:
   (a) obtaining a first image acquired at a first time of a first position within a queue;
   (b) obtaining a second image acquired at a second time of a second position within the queue;
   (c) detecting a queue member within the first image;
   (d) detecting a queue member with the second image;
   (e) determining that the queue member detected within the second image is the same as the queue member detected within the first image; and
   (f) determining a trajectory of the queue member within the queue based on a difference between the first time and the second time.
2. The method of clause 1 further comprises the steps of obtaining further images of further positions within the queue and detecting the queue member within these further images.
3. The method of clause 1 or clause 2, wherein the images overlap.
4. The method according to any previous clause, wherein the positions within the queue are selected from the front of the queue, back of the queue, and the middle of the queue.
5. The method according to any previous clause, wherein further pairs of images are obtained, used to detect the queue member, and determine their trajectory, wherein each pair of images includes at least one common point in the queue.
6. The method according to any previous clause, wherein determining the trajectory further includes the step of forming the trajectory from two or more other trajectories.
7. The method according to clause 6, wherein determining that the queue member detected within the second image is the same as the queue member detected within the first image is based on similarities of visual appearances of the queue member within each image.
8. The method of clause 7, wherein determining a trajectory of the queue member within the queue further comprises the step of applying a Munkres assignment algorithm to the two or more other trajectories and the similarities of the visual appearances of the queue member within each image.
9. The method according to any previous clause, wherein detecting the queue member within an image further comprises selecting a group of pixels containing the queue member.
10. The method according to any previous clause, wherein the images are video images.
11. The method according to any previous clause, wherein determining a trajectory of the queue member within the queue is further based on the queuing distance between the first position and the second position.
12. The method according to any previous clause further comprising the step of determining from the trajectory a total queuing time for the queue member.

13. The method according to any previous clause further comprising iterating steps (a) to (f) to determine a plurality of trajectories.

14. The method of clause 13 further comprising determining an average trajectory from the plurality of trajectories.

15. The method of clause 14, further comprising the step of determining an average queue time from the average trajectory.

16. The method according to any previous clause, wherein the trajectory includes data describing how the queue member moves through the queue over time.

17. A system for analysing a queue comprising a processor configured to:
   (a) receive a first image acquired at a first time of a first position within a queue;
   (b) receive a second image acquired at a second time of a second position within the queue;
   (c) detect a queue member within the first image;
   (d) detect a queue member with the second image;
   (e) determine that the queue member detected within the second image is the same as the queue member detected within the first image; and
   (f) determine a trajectory of the queue member within the queue based on a difference between the first time and the second time.

18. The system of clause 17 further comprising a first and a second camera arranged to capture the first and second images, respectively.

19. The system of clause 18, wherein the first and second cameras are arranged to have partially overlapping views of the queue.

20. The system according to any of clauses 17 to 19 further comprising a user interface configured to receive a signal indicating the first and the second positions of the queue on the first and second images.

21. The system of clause 20, wherein the first or second positions of the queue are selected from: the start of the queue, an intermediate position in the queue, and the end of the queue.

22. A method substantially as described with reference to any of the accompanying drawings.

23. An apparatus substantially as described and shown in any of the accompanying drawings.

24. A computer program comprising program instructions that, when executed on a computer cause the computer to perform the method of any of clause 1 to 16.

25. A computer-readable medium carrying a computer program according to clause 24.

26. A computer programmed to perform the method of any of clauses 1 to 16.

BRIEF DESCRIPTION OF THE FIGURES

The present invention may be put into practice in a number of ways and embodiments will now be described by way of example only and with reference to the accompanying drawings, in which:

FIG. 2 shows a schematic diagram of a camera view of a first part of a queue;

FIG. 3 shows a schematic diagram of a camera view of a second part of the queue of FIG. 2.

Figure 1:
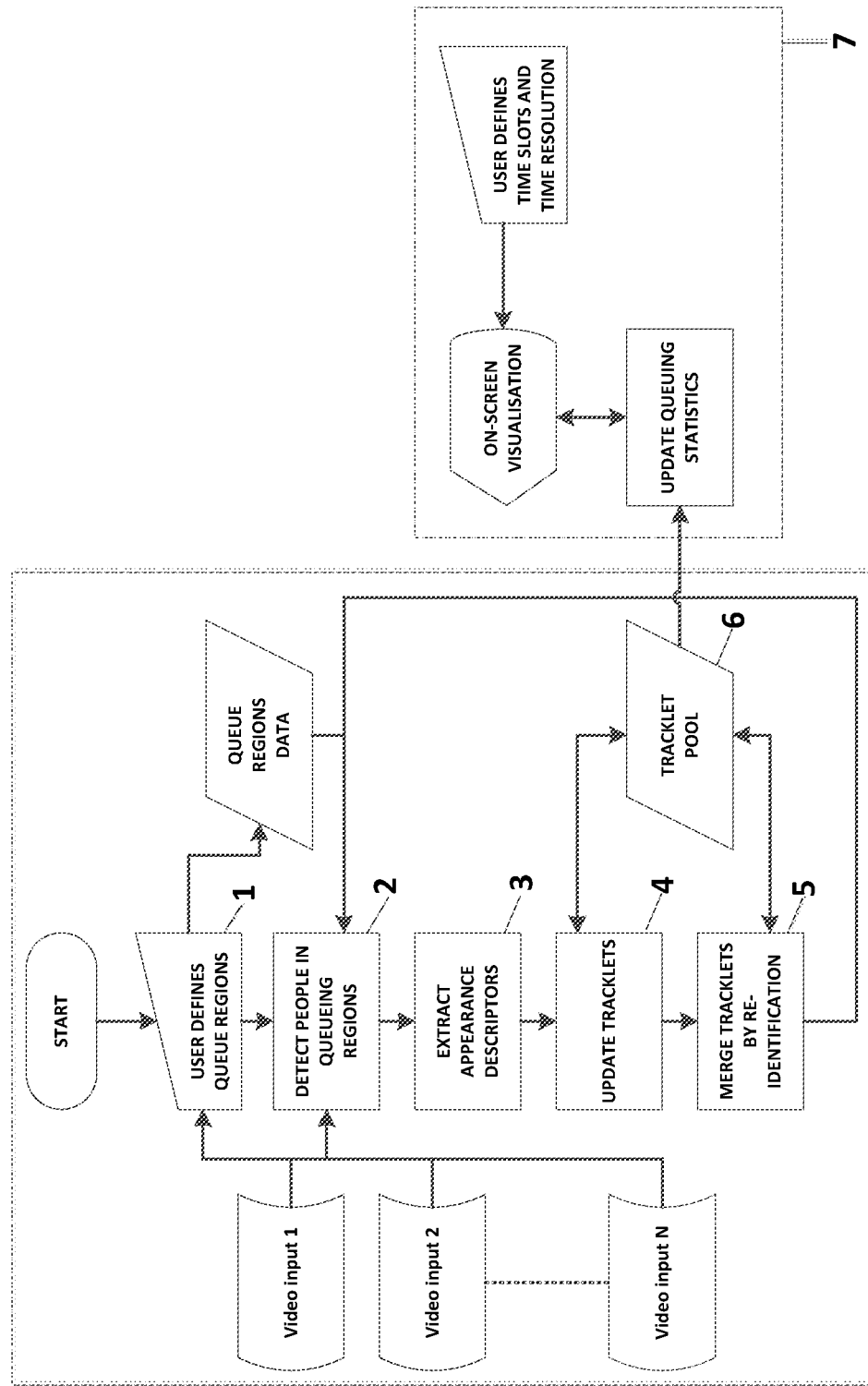
FIG. 1 shows a flow diagram of a method for analysing a queue, given by way of example only.

It should be noted that the figures are illustrated for simplicity and are not necessarily drawn to scale.

DETAILED DESCRIPTION OF THE PREFERRED EMBODIMENTS

In one example implementation, the system and method may be an automated visual analysis of queuing statistics within user-defined queuing regions spanning multiple and preferably contiguous camera views.

The system and method allows analysis of people queuing and queue management. More specifically, the system facilitates interactive and automated analysis of video streams depicting people in queues for the derivation of queuing statistics (e.g. average queuing times), along with real-time graphical visualisation for human users.

The method and system may be interactive together with an automated queue analysis system configured to derive more accurate and useful statistics for queue management in a non-invasive manner. The method and system may operate by automatically detecting and tracking individuals within video streams from video cameras encompassing the length or substantially the length of a queue. The queue may be automatically or manually segmented into a fixed number of visual regions. Person tracks involve multiple associated individual detections (video frames) of the individual concerned, with transition times computed between the individual detections within a track and associated with the defined queue regions. The observed transition times for individual queue regions are then aggregated over time and overall queue estimates derived accordingly by integrating over individual queue region estimates. Corresponding plots may be generated for denoting observed overall queuing times within different time slots for human visualisation.

Deriving such estimates may be obtained in this way by relaxing requirements imposed by other prior art visual sensor based systems to accurately track every individual in the queue for the duration of their presence; i.e. prior art techniques require the detection of a queue member in every video frame and then generate a complete track characterising their movement along the queue in its entirety.

In contrast, the present method and system only requires two or more detections per individual in the form of partial "tracklets" encompassing a portion of the whole queue (i.e. less than the whole of the queue). This may be sufficient to derive useful statistics over time, and provides an advantage in enabling usability of the system in larger and more crowded environments where queuing individuals may at times undergo temporary occlusion.

An interactive component may enable a human user to define the position and extent of a queue spanning multiple camera views, as well as to specify time slots for real-time visualisation of generated queuing statistics.

The method may be arranged into several component steps. This is illustrated schematically as a process flow between different system components or modules in FIG. 1.

An interactive graphical user interface (GUI) based component 1 enables users to graphically delineate the position and extent of a queue spanning multiple partially-overlapping camera views. The interface 1 presents successive pairs of camera views on screen, which the user may mark with the mouse or other pointing device to indicate queue position landmarks corresponding to, for example: (a) the back of the queue (for the first camera view); (b) one or more connecting regions denoting the same physical position in intermediate pairs of camera views to characterise the "joins" between those views; and (c) the front of the queue (for the last camera view). Other landmarks may be defined. The resulting set of queue position landmarks indicates a region of interest for further analysis by describing a preferably seamless position and extent of the queue across the multiple camera views. This is illustrated further in FIG. 2, where camera view 1 is of a first section of a queue and FIG. 3 shows a camera view 2 that is of the last section of the queue. The front of the queue is marked as a first landmark 10. A middle region is marked as a second landmark 20. The end of the queue is marked as a third landmark 30. The middle region landmark 20 is visible in both camera views 1 and 2 (i.e. the views overlap).

A processing component may consist of four modules for performing a four-stage person detection and analysis procedure.

A module comprising a person detector 2 may denote the positions of individual people in each camera view. These denotations may take the form of a "bounding box" indicating a rectangular (or other shaped) region of pixels that make up a detected individual. Reference [1] illustrates a person detector 2 based on a mixtures of multiscale deformable part models, although other techniques may be used. The single component person model described with reference to FIG. 1 of reference [1] illustrates one type of person detector that may be used with the present system and method and the remainder of reference [1] provides technical details of an example person detector and associated mathematical functions. Reference [1] therefore provides the skilled person with the material and examples necessary to build a software-based person detector.

FIG. 1 shows a module for extracting a visual appearance descriptor of detected individuals 3, which may comprise, for example, 29 different types of texture and colour features. Examples of these features are shown in references [2] and [3]. These feature descriptors may be generated from image patches denoting individuals within the bounding boxes generated by the person detector 2 described above and in reference [1].

FIG. 1 also shows a module for associating individual detections on the basis of temporal, appearance and spatial consistency to derive "tracklets" characterising their partial trajectories along the user-defined queue path (module 4). For example, the Munkres Assignment algorithm, also known as the Hungarian algorithm (see references [4] and [5] for a detailed description of this algorithm) may be used by this module 4 to group the automatically detected individuals in the visual appearance descriptor 3 across different frames into small trajectory segments called "tracklets" (or sub-trajectories through the queue), based on space-time consistency (individuals' locations and speed of movement between frames) and similarity of appearance based on appearance descriptors generated in module 2. The result may be a description of an individual's position in multiple frames, capturing their movement along the queue over time.

A module for merging "tracklets" on the basis of similarity in appearance and space-time consistency (module 5) may also be provided. This module 5 may be used to combine multiple tracklets (or small portions of the queue) that correspond to the same individual to form a lager track or trajectory. More specifically, two or more tracklets may be merged by combining several measures of similarity, for example: (a) similarity of appearance; (b) consistency of position; and (c) consistency of speed [6]. If the similarity exceeds a fixed or predetermined threshold, then the tracklets may be merged into one. Such merged tracklets may be further combined if necessary. During system operation, each newly generated tracklet may be compared with a "pool" of all existing tracklets (FIG. 1, tracklet pool 6) and either merged if suitably similar (as per the method above) or left to stand alone as part of the pool.

An interactive processing system 7 is shown FIG. 1 and is configured to derive statistical plots characterising queuing transition time trends, e.g. average queuing times, over user-defined time slots. More precisely, users interested in viewing queuing statistics may select, for example: (a) the time period within which to perform the analysis, such as between certain hours of the day or between certain months of the year; and (b) the time resolution of the plot, e.g. on a daily basis or an hourly basis. This component may then update the queuing statistics by analysing the tracklets generated over the selected time period, and generates an on-screen visualisation in the form of a bar graph or other display denoting the average queuing times observed over those time periods with a selectable time resolution.

These components enable more robust interactive real-time queue statistical analysis and graphical visualisation for human users in large crowded areas. It operates by automatically detecting and tracking individuals within video streams from video cameras encompassing the length of a queue, which may be automatically or manually segmented into a fixed number of visual regions. Person or queue member tracks may involve multiple associated individual detections (video frames) of the individual concerned, with transition times computed between the individual detections within a track and associated with the defined queue regions. The observed transition times for individual queue regions may then be aggregated over time and overall queue estimates derived accordingly by integrating over individual queue region estimates. Corresponding plots are generated for denoting observed overall queuing times within different time slots for human visualisation. This process continues indefinitely with real-time refinement of statistics and visualisation.

Figure 4:
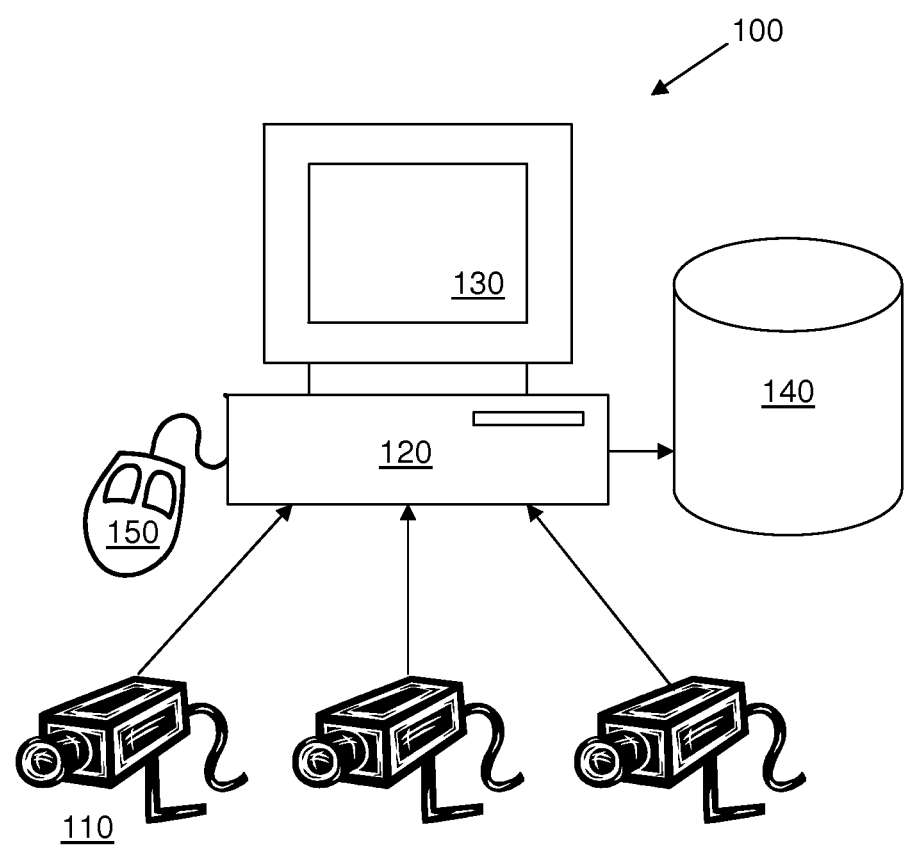
FIG. 4 shows a schematic diagram of a system for analysing the queue.

FIG. 4 illustrates a system 100 for operating the method described above. In particular, video feeds are provided by cameras 110. A computer 120 executes the functionality of modules 1-7 described with reference to FIG. 1. Display 120 is used to define the queue landmarks and to provide queuing statistics and other data to be visualised. Data store 140 is used to record the video feeds, where necessary, and to record calculated results and statistics. Pointing device (mouse 150) is used by a human user to interact with the system 100 (e.g. to define queue landmarks). The computer may operate a suitable operating system such as Linux, UNIX, MS Windows, or Apple OSX, for example. The computer system and cameras 110 may be linked over a network, such as the internet or an intranet, for example.

In one example implementation (others may be used), detection, extraction and matching of queue members may use a parts-based person detector [1] to detect individuals (queue members) and produce bounding boxes indicating the position and size of individuals in image frames. Image patches within these bounding boxes may then each be split into a number of equal horizontal segments (for example six). Within each segment, a comprehensive set of types of visual features are extracted (for example 29 types), encompassing the colour and texture appearance of individuals for matching [2]. More specifically, these colour features incorporate different colour spaces including RGB, Hue-Saturation and YCrCb, with texture features derived from Gabor wavelet responses at eight different scales and orientations, as well as thirteen differently parameterised Schmid Filters [9], for example. Normalised histograms are generated capturing the statistics of these features for each horizontal segment, and then concatenated into a single feature vector. Given 16 bins for the histogram corresponding to each of the 29 feature types for each of the six horizontal strips, we thus have a 2784-dimensional feature vector per bounding box, which may be used as an appearance descriptor. Rather than consider each feature type equally in terms of relevance, the system may dynamically learn the importance of each of these feature types to more strongly weight those features most relevant for matching across different cameras [2, 3, 10]. The resulting model may take the form of a support vector machine (SVM) known as RankSVM [8, 7]. This model may be used to compute matching scores between the appearance descriptors of detected individuals.

The Munkres Assignment algorithm, also known as the Hungarian algorithm [5, 4], may be employed as part of a multi-target tracking scheme to locally group detections in different frames as likely belonging to the same person or queue member. This process may yield tracklets encompassing individual detections over multiple frames. An individual queue member D is accordingly represented as a trackelt $T_D=\{\alpha_{D,1}, \ldots, \alpha_{D,J}\}$ comprising J individual detections with appearance descriptors $\alpha_{D,j}$.

More precisely, tracklets may be built up incrementally over time, with an incomplete set updated after each frame by assigning individual detections from that frame to a tracklet according to their appearance similarity and spatial proximity. That is, given: (1) a set $S=\{\alpha_{1,f}, \ldots, \alpha_{M,f}\}$ of M appearance descriptors for detections in frame f with corresponding pixel locations $\{\beta_{1,f}, \ldots, \beta_{M,f}\}$; (2) a current set of N incomplete tracklets $R=\{T_1, \ldots, T_N\}$ with their most recently added appearance descriptors $\{\hat{\alpha}_{n,f_n}\}$; and (3) corresponding predicted pixel locations $\{\hat{\beta}_{n,f}\}$, an M×N cost matrix C is generated where each entry $C_{m,n}$ is computed as:

$$C_{m,n}=\omega_1|\hat{\alpha}_{n,f_n}-\alpha_{m,f}|+\omega_2|\hat{\beta}_{n,f}-\beta_{m,f}| \quad (1)$$

In essence, this cost is computed as a weighted combination of appearance descriptor dissimilarity and physical pixel distance. Predicted pixel locations $\hat{\beta}_{n,f}$ for frame f are estimated by assuming constant linear velocity from the last known location and velocity. The Munkres Assignment algorithm maps rows to columns in C so as to minimise the cost, with each detection added accordingly to their mapped incomplete tracklets. Surplus detections are used to initiate new tracklets. In practice, an upper bound is placed on cost, with assignments exceeding the upper bound retracted and the detection concerned treated as surplus. Additionally, tracklets which have not been updated for a length of time may be treated as complete.

REFERENCES

[1] P. Felzenszwalb, R. Girshick, D. McAllester, and D. Ramanan. Object Detection with Discriminatively Trained Part Based Models. In *IEEE Transaction on Pattern Analysis and Machine Intelligence*, Vol. 32, No. 9, September 2010.

[2] B. Prosser, W. Zheng, S. Gong, and T. Xiang. Person Re-Identification by Support Vector Ranking. In *British Machine Vision Conference*, September 2010.

[3] W. Zheng, S. Gong, and T. Xiang. Person re-identification by Probabilistic Relative Distance Comparison. In *IEEE Conference on Computer Vision and Pattern Recognition*, June 2011.

[4] J. Munkres. Algorithms for the Assignment and Transportation Problems. In *Journal of the Society for Industrial and Applied Mathematics*, 5(1):32-28, 1957.

[5] H. W. Kuhn. The Hungarian Method for the Assignment Problem. In *Naval Research Logistics Quarterly*, 2:83-97, 1955.

[6] J. Prokaj, M. Duchaineau, and G. Medioni. Inferring Tracklets for Multi-Object Tracking. In *IEEE Conference on Computer Vision and Pattern Recognition*, 2011.

[7] O. Chapelle and S. Keerthi. Efficient algorithms for ranking with SVMs. In *Information Retrieval*, volume 32, 2010.

[8] T. Joachims. Optimizing search engines using clickthrough data. In *Knowledge Discovery and Data Mining*, pages 133-142, 2010.

[9] C. Schmid. Constructing models for content-based image retrieval. In *IEEE Conference on Computer Vision and Pattern Recognition*, pages 30-45, 2001.

[10] W. Zheng, S. Gong, and T. Xiang. Re-identification by relative distance comparison. In *IEEE Transactions on Pattern Analysis and Machine Intelligence*, 35(3):653-668, March 2013.

As will be appreciated by the skilled person, details of the above embodiment may be varied without departing from the scope of the present invention, as defined by the appended claims.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A computer-implemented method of analysing a queue comprising the steps of:
   (a) obtaining, by a computer processor, a first image acquired at a first time of a first position within a queue;
   (b) obtaining, by the computer processor, a second image acquired at a second time of a second position within the queue;
   (c) detecting, by the computer processor, a queue member within the first image;
   (d) detecting, by the computer processor, a queue member within the second image;
   (e) determining, by the computer processor, that the queue member detected within the second image is the same as the queue member detected within the first image; and
   (f) determining, by the computer processor, a trajectory of the queue member within the queue based on a difference between the first time and the second time.

2. The method of claim 1 further comprising obtaining further images of further positions within the queue and detecting the queue member within these further images.

3. The method of claim 1, wherein the images overlap.

4. The method according to claim 1, wherein the positions within the queue are selected from the front of the queue, back of the queue, and the middle of the queue.

5. The method according to claim 1, wherein further pairs of images are obtained, used to detect the queue member, and determine their trajectory, wherein each pair of images includes at least one common point in the queue.

6. The method according to claim 1, wherein determining the trajectory further includes the step of forming the trajectory from two or more other trajectories.

7. The method according to claim 6, wherein determining that the queue member detected within the second image is the same as the queue member detected within the first image is based on similarities of visual appearances of the queue member within each image.

8. The method of claim 7, wherein determining a trajectory of the queue member within the queue further comprises the step of applying a Munkres assignment algorithm to the two or more other trajectories and the similarities of the visual appearances of the queue member within each image.

9. The method according to claim 1, wherein detecting the queue member within an image further comprises selecting a group of pixels containing the queue member.

10. The method according to claim 1, wherein determining a trajectory of the queue member within the queue is further based on the queuing distance between the first position and the second position.

11. The method according to claim 1, further comprising the step of determining from the trajectory a total queuing time for the queue member.

12. The method according to claim 1, further comprising iterating steps (a) to (f) to determine a plurality of trajectories.

13. The method of claim 12 further comprising determining an average trajectory from the plurality of trajectories.

14. The method of claim 13, further comprising the step of determining an average queue time from the average trajectory.

15. A system for analysing a queue comprising:
a processor configured to:
(a) receive a first image acquired at a first time of a first position within a queue;
(b) receive a second image acquired at a second time of a second position within the queue;
(c) detect a queue member within the first image;
(d) detect a queue member within the second image;
(e) determine that the queue member detected within the second image is the same as the queue member detected within the first image; and
(f) determine a trajectory of the queue member within the queue based on a difference between the first time and the second time.

16. The system of claim 15 further comprising a first and a second camera arranged to capture the first and second images, respectively.

17. The system of claim 16, wherein the first and second cameras are arranged to have partially overlapping views of the queue.

18. The system according to claim 15 further comprising a user interface configured to receive a signal indicating the first and the second positions of the queue on the first and second images.

19. The system of claim 18, wherein the first or second positions of the queue are selected from: the start of the queue, an intermediate position in the queue, and the end of the queue.

20. One or more non-transitory computer readable media storing computer readable instructions that, when executed, cause a system to perform a method of analyzing a queue by:
obtaining a first image acquired at a first time of a first position within a queue;
obtaining a second image acquired at a second time of a second position within the queue;
detecting a queue member within the first image;
detecting a queue member within the second image;
determining that the queue member detected within the second image is the same as the queue member detected within the first image; and
determining a trajectory of the queue member within the queue based on a difference between the first time and the second time.

* * * * *